United States Patent

Kaifesh

[15] 3,638,324
[45] Feb. 1, 1972

[54] GAGE

[72] Inventor: Cass Kaifesh, 9947 Corella, Whittier, Calif. 90603

[22] Filed: July 31, 1969

[21] Appl. No.: 846,356

[52] U.S. Cl. ............................................. 33/174, 33/174 Q
[51] Int. Cl. ..................... G01b 5/12, G01b 5/16, G01b 5/28
[58] Field of Search .................. 33/143 A, 147 J, 174 Q, 199, 33/147 A, 147 K, 167

[56] References Cited

UNITED STATES PATENTS

| | | | |
|---|---|---|---|
| 2,803,886 | 8/1957 | Sunnen | 33/178 A |
| 2,911,725 | 11/1959 | Sleigh | 33/199 |
| 3,054,189 | 9/1962 | Coulson | 33/178 A |
| 3,090,126 | 5/1963 | Kernoski | 33/199 |
| 3,111,766 | 11/1963 | Bryant | 33/167 |
| 3,257,729 | 6/1966 | Fricke | 33/147 J |
| 3,302,294 | 2/1967 | Eguchi | 33/147 J |
| 3,327,397 | 6/1967 | Mangano | 33/147 J |

*Primary Examiner*—Leonard Forman
*Assistant Examiner*—Paul G. Foldes
*Attorney*—Smyth, Roston & Pavitt

[57] ABSTRACT

A gage including a supporting structure, a first finger element mountable in fixed relationship on the supporting structure and a second finger element movably mounted on the supporting structure. The finger elements are insertable into a bore to provide a measurement thereof. A squaring member is mounted on the supporting structure and is engageable with the outer face of the work to control the angle at which the fingers project into the bore.

23 Claims, 12 Drawing Figures

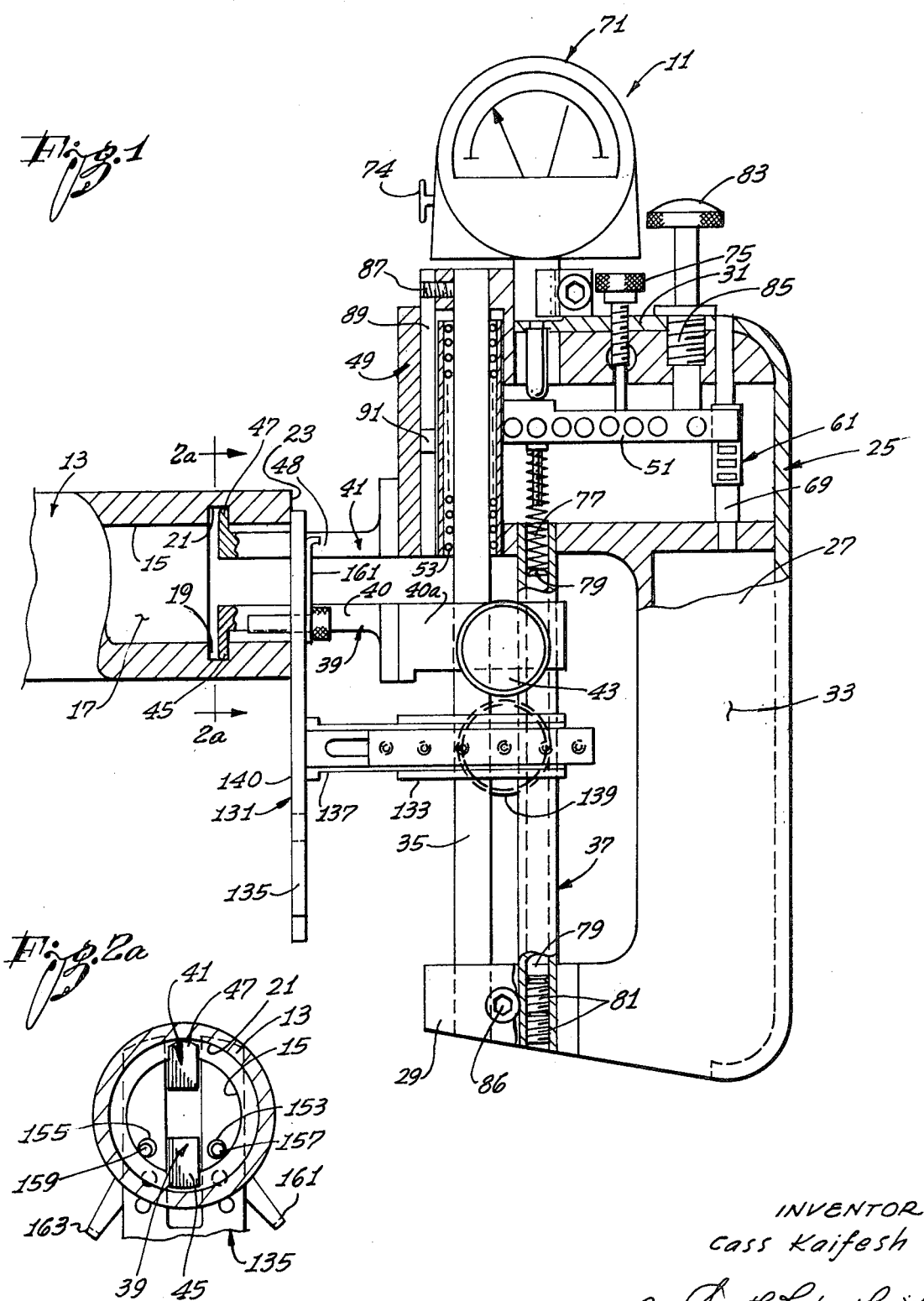

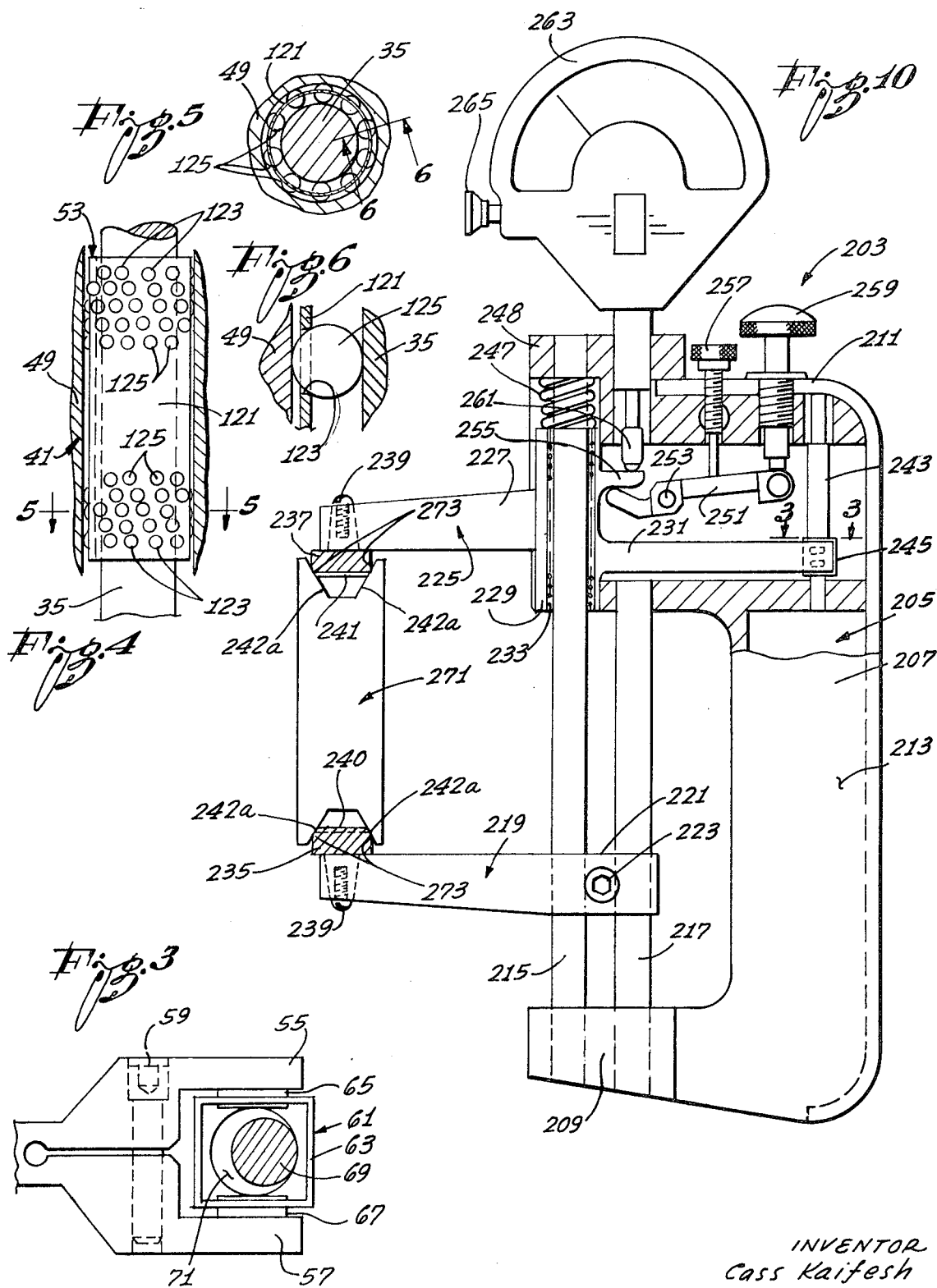

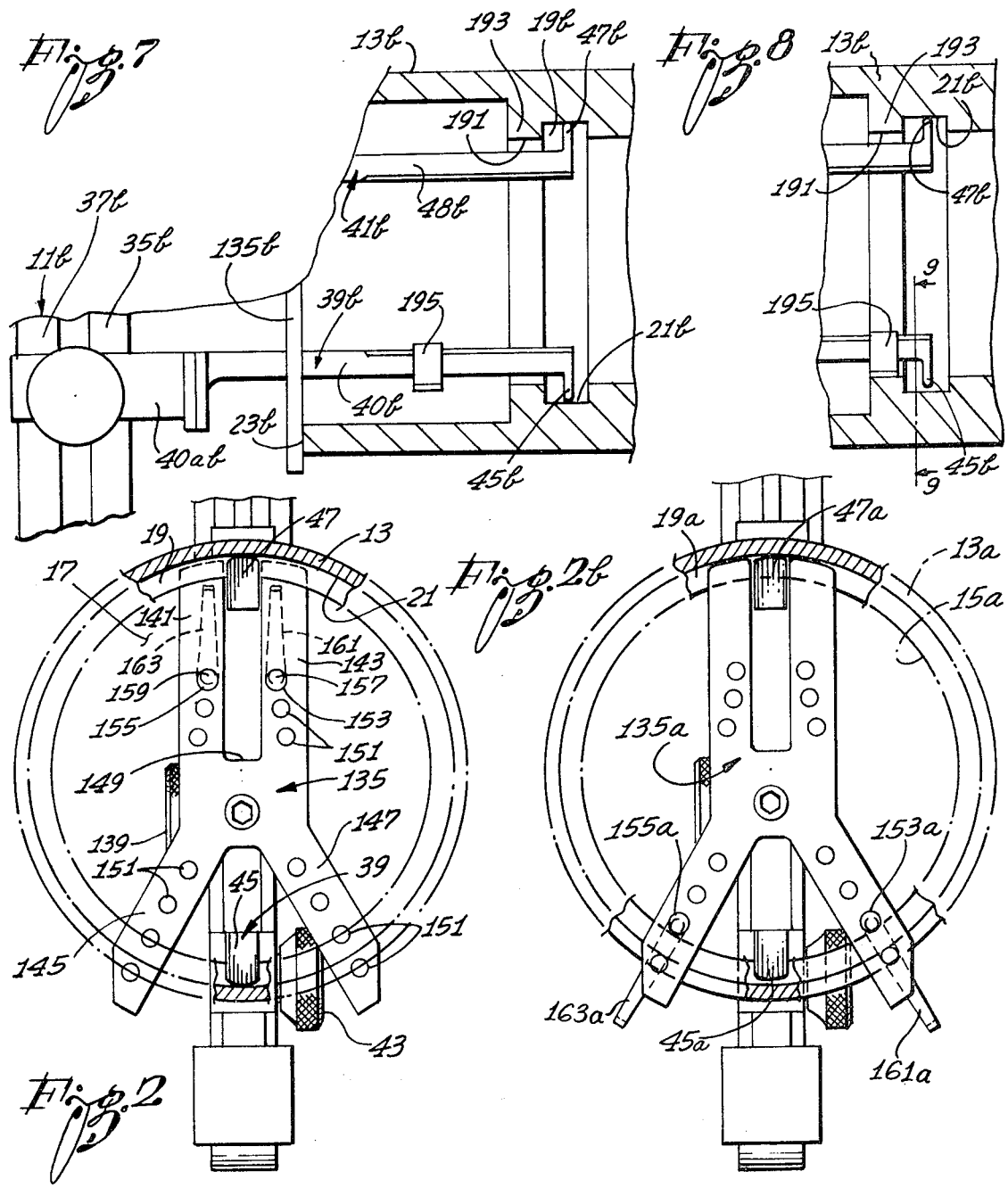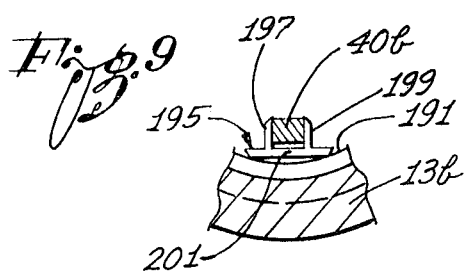

GAGE

BACKGROUND OF THE INVENTION

This invention relates to gages such as a groove gage and a thread gage which are useful in making various measurements of objects. The term "measurement" is used herein to include measurements such as variations in diameter or a comparative measurement such as concentricity. A groove gage is used to measure, for example, the depth of a groove or variations in the depth of a groove formed in the inside surface of a pipe or the concentricity of the groove and the internal diameter of the pipe. Internal measurement such as these can be made by a gage having two elements or fingers at least one of which is movable and both of which engage the internal surface which is to be measured. Thread gages are used to check the characteristics of internal or external threads.

One disadvantage of prior art gages of this general type is that the measurements provided thereby are often not as accurate as desired. The reduced accuracy may result from the gage itself as where the finger elements which contact the work become misaligned. In a groove gage, for example, misaligned fingers, i.e., those which are not in the same plane and spaced apart 180° will produce erroneous readings.

Another disadvantage with prior art gages used for making internal measurements is that it is necessary for the workman to "search" in two directions in order to make an accurate measurement. More particularly, the workmen must move the gage both axially and circumferentially of the bore which is to be measured in order to assure that the measurement which is taken extends along a diameter of the pipe. This two-directional search is most difficult to accurately perform, and it should be done by a skilled workman. Furthermore, it lengthens the time for taking the measurement.

SUMMARY OF THE INVENTION

The present invention provides a very accurate gage which produces accurate results even though it is operated by a relatively inexperienced workman. The measurement provided by the gage may be an absolute measurement such as the internal diameter of a pipe or a relative measurement such as the concentricity of a groove with the internal wall of the pipe. With the present invention, diameters and concentricity can be checked in one set up of the gage.

The present invention provides a gage which includes two finger elements which are engageable with the work to provide the desired measurement. To accurately align the finger elements, the present invention mounts the two finger elements on a common shaft. Preferably two parallel shafts are provided and one finger element is fixed to both shafts to thereby firmly retain that finger element in position, and the other finger element is movably mounted on only one of the shafts for movement therealong. The two finger elements engage the surfaces which are to be measured such as the internal diameter of a pipe or internal or external threads.

To assure that the two finger elements are mounted in the same plane, the finger element which is mounted on only one shaft has an adjusting portion. The adjusting portion is engageable with an adjusting member which pivots the finger elements slightly about the shaft until this finger element is coplanar with the other of the finger elements.

To assure correct relative depth of insertion and to insure that the finger elements will be inserted into the bore at the desired angle, a squaring member is provided. The squaring member may be in the form of a plate mounted on the supporting structure of the gage and engageable with the outer face of the object which contains the bore that is to be measured. By inserting the finger element into the bore until the squaring member engages the outer face of the pipe, it is unnecessary to tilt the gage and the pipe axially relative to each other. Rather, it is only necessary to move the gage slightly circumferentially relative to the pipe, i.e., to search in one direction, to find the so-called high point at which the measurement is to be taken. This allows an inexperienced workman to perform the measuring operation and also permits the measuring operation to be accomplished much more rapidly than was possible heretofore.

In pipes having a bore or passageway and a groove formed on the internal surface of the pipe, it is often necessary to measure the concentricity of the bore and the groove. To accomplish this, the present invention provides two members which are selectively movable into engagement with the wall of the bore and a movable finger element which is engageable with the circumferential surface of the groove. By relatively rotating the gage and the pipe, the concentricity can be measured. Preferably the movable members for engaging the internal wall of the pipe are movably mounted on the squaring member and are selectively movable into engagement with the wall of the pipe. Where the groove is located a substantial distance axially inwardly of the end of the pipe and the concentricity of the groove and a closely adjacent wall is to be checked, the present invention provides a movable element on the fixed finger which is engageable with such wall to serve as one of the measuring members.

Another feature of the present invention is the bearing which is used to movably mount the movable finger on the shaft. It is important that gages of this type be accurately set at the manufacturer's plant. Accordingly, the present invention provides means which substantially impede reassembly of the gage should it be disassembled after leaving the manufacturer's plant.

According to the present invention, this is accomplished by providing a bearing comprising a large number of segments which immediately and automatically become disassembled upon removal of the bearing from the gage. In a preferred form, the bearing includes a retainer having a plurality of apertures therein and a plurality of bearing segments such as balls positionable, respectively, in the apertures. The retainer serves to hold the bearing segments in spaced relationship, and the segments are retained in or partially within the apertures by the retainer and one of the adjacent members or by both of the members which engage the bearing. Preferably, to reduce backlash, the retainer is in the form of a sleeve and the apertures are circular with a diameter smaller than the diameter of the balls so that the balls cannot pass through their respective apertures. The balls engage the retainer and one of the adjacent members and are thereby retained in position. However, the balls are detached from the retainer so that upon removal of the bearing from the adjacent members, the balls separate from the retainer to thereby serve as a substantial impediment against the assembly of the gage outside of the factory environment where it was constructed.

The invention, both as to its organization and method of operation together with further features and advantages thereof may best be understood by reference to the following description taken in connection with the accompanying drawings in which:

FIG. 1 is an elevational view partially in section of a groove gage constructed in accordance with the teachings of this invention.

FIG. 2 is an elevational view taken along line 2—2 of FIG. 1 with the gage being utilized to measure a groove on a larger diameter pipe than that shown in FIG. 1.

FIG. 2a is an elevational view taken along line 2—2 of FIG. 1 showing how the gage checks concentricity.

FIG. 2b is an elevational view similar to FIG. 2 showing how the gage can be used to check concentricity of a larger diameter pipe.

FIG. 3 is an enlarged sectional view taken along line 3—3 of FIGS. 1 or 10 and illustrating the mechanism for adjusting the angular position of the movable finger element.

FIG. 4 is a fragmentary elevational view illustrating the bearing used for movably mounting the movable finger element on the shaft.

FIG. 5 is a sectional view taken along line 5—5 of FIG. 4.

FIG. 6 is an enlarged fragmentary sectional view taken along line 6—6 of FIG. 5.

FIG. 7 is a fragmentary sectional view illustrating a modification of the mechanism for checking concentricity with the slidable concentricity element retracted.

FIG. 8 is a fragmentary sectional view similar to FIG. 7 with the concentricity element advanced so that a concentricity check can be made.

FIG. 9 is a sectional view taken on line 9—9 of FIG. 8.

FIG. 10 is an elevational view partially in section of a thread gage embodying several of the concepts of this invention.

DESCRIPTION OF THE PREFERRED EMBODIMENT

Referring to the drawings and in particular to FIG. 1 thereof, reference numeral 11 designates a groove gage constructed in accordance with the teachings of this invention. The groove gage is illustrated in FIG. 1 as being utilized to make internal measurements of a pipe 13. The pipe 13 has an internal surface 15 defining a passage or cavity 17 therein. A groove 19 having a circumferentially extending surface 21 is formed in the internal surface 15 of the pipe 13. The pipe 13 terminates in an outer annular face 23 which faces the gage 11.

The gage 11 includes a frame or supporting structure 25 which may include a cover 27 so that a housing for the gage is provided. The frame 25 as viewed in FIG. 1 includes leg sections 29 and 31 interconnected by a web 33. A pair of parallel rods or shafts 35 and 37 are mounted on and extend between the leg sections 29 and 31.

The gage 11 includes a fixed finger element 39 and a movable finger element 41. The fixed finger element 39 includes a work contacting section 40 and a holder 40a with the former being removably mounted on the latter. The holder 40a is a clamp like member which clampingly embraces the shafts 35 and 37 and which is releasably held in clamping position by a threaded fastener 43. The fastener 43 can be unscrewed from the holder 40a to allow sliding movement of the finger element 39 along the shafts 35 and 37. When the fixed finger element 39 is moved to the desired position along the shafts 35 and 37, the fastener 43 is tightened to clamp the holder 40a to the shafts.

The finger element 39 is rigid and projects away from the shaft 35. The finger element 39 is preferably generally perpendicular to the shaft 35 and has a radially or transversely extending tip 45 at the outer end thereof for engaging the circumferentially extending surface 21 of the groove 19.

The finger element 41 also extends away from the shaft 35 and is perpendicular to the shaft 35 and coplanar with the finger element 39. The movable finger element 41 has a tip 47 which is also adapted to engage the circumferentially extending surface 21 of the groove 19. The finger element 41 includes a work contacting section 48 and a holder 49 with the section 48 being releasably mounted on the holder 49.

The movable finger 41 also includes an elongated section 51 which may be a part of the holder 49. The holder 49 is mounted by a bearing 53 for movement along the shaft 35. The finger element 41 is movable axially of the shaft 35 in accordance with the dimensions of the object being measured.

With reference to FIGS. 1 and 3, the innermost end of the section 51 defines resilient arms 55 and 57 (FIG. 3), the spacing between which can be varied by a screw 59. A roller bearing 61 is suitably mounted between the arms 55 and 57. The roller bearing 61 includes a housing or retainer 63 and two sets of rollers 65 and 67 mounted for engagement with the inner faces of the arms 55 and 57, respectively.

A guide pin 69 having an eccentric portion 71 (FIG. 3) is mounted on the leg section 31 of the frame end extends through the roller bearing 61. The guide pin 69 is suitably rotatably mounted so that by turning of the guide pin, the eccentric 71 pivots the section 51 of the movable finger 41 about the shaft 35. This permits angular adjustment of the finger 41 to cause the latter to be coplanar with the finger 39. This adjustment having been made, the guide pin 61 is then suitably locked in position to prevent further rotational movement thereof.

The rollers 65 and 67 bear on the arms 55 and 57, respectively, and on the eccentric portion 71. As the finger 41 moves axially of the shaft 35, the arms cause the rollers to roll with the result that the bearing moves one-half the distance moved by the finger 41.

The amount of travel of the section 51 relative to a predetermined position is measured by an indicator 71. The indicator 71 has a tip 73 which engages an upper surface of the section 51 and is moved thereby. The indicator can be zeroed by turning a knob 74.

The limits on the upward travel of the section 51 is set by an adjustable stop 75 which, in the embodiment illustrated, is in the form of a screw mounted on the upper section of the leg section 31. A coil spring 77 engages the section 51 to urge the latter upwardly as viewed in FIG. 1. The lower end of the spring 77 engages a rod 79 slidably mounted within the shaft 37. The axial position of the rod 79 within the shaft 37 can be adjusted by set screws 81 which are threadedly received within the lower end of the shaft 37. Thus, by turning of the set screws 81, the force which the spring 77 exerts on the section 51 can be adjusted.

To facilitate downward movement of the finger 41 during set up, a plunger 83 is mounted on the upper end of the leg section 31 in any suitable manner as by a bushing 85. The plunger 83 is slidable relative to the leg section 31 to thereby act to depress the section 51 against the biasing force of the spring 77.

The shafts 35 and 37 can be mounted in parallel relationship on the leg sections 29 and 31 in any suitable manner. In the embodiment illustrated, the leg section 29 defines a clamp which clampingly receives the lower ends of the shafts 35 and 37. The clamp is tightened and released by a screw 86. The upper end of the shaft 37 is suitably mounted on the leg section 31, and the upper end portion of the shaft 35 is suitably retained in the leg section 31 as by a setscrew 87 (FIG. 1).

The finger 41 projects through a slot 89 in the frame 25. Specifically, a web section 91 of the finger element 41 rides in the slot.

The details of the bearing 53 are shown in FIGS. 4–6. The bearing 53 is generally tubular and fits between the cylindrical shaft 35 and the cylindrical aperture through the holder 49 of the movable finger element 41. In the embodiment illustrated, the bearing 53 includes a retainer in the form of a cylindrical sleeve 121 having numerous apertures 123 therein. In the embodiment illustrated, the end portions of the sleeve 121 have the apertures 123 therein and the central portion of the sleeve is free of apertures. A plurality of balls 125 are positioned, respectively, in the apertures 123. As shown in FIG. 5, the apertures 123 and the balls 125 are provided completely around the shaft 35.

As best seen in FIG. 6, each of the balls 125 are detached from the retainer 121. The aperture 123 is circular and the diameter of the ball 125 is greater than that of the associated aperture so that the ball cannot pass therethrough. In the embodiment illustrated, the ball 125 is held between the retainer 121 and the shaft 135. Thus, if the bearing 53 were removed from the shaft 35, the balls 125 would be free to separate from the retainer thereby completely dismantling the bearing. No coining or other means of attachment are utilized to attach the balls 125 to the retainer 121. As the finger 41 moves along the shaft 35, the balls 125 roll to permit low friction movement of the finger 41. Although the balls 125 could be retained between the retainer 121 and the outer member or holder 49, it is preferred to retain the balls between the retainer and the inner member or shaft 35.

A squaring member 131 (FIG. 1) is mounted on the shafts 35 and 37. The squaring member 131 includes a holder 133, a plate 135 and a connecting member 137 for releasably connecting the plate to the holder 133. The member 137 can be connected at any one of numerous positions to thereby vary the spacing between the plate 131 and the shaft 35. The holder 133 is preferably a two-piece clamp-type holder with the two pieces of the clamp being interconnected by a screw 139 which is threadedly attached to both portions of the holder. By tightening of the screw 139, the holder 133 can be caused to tightly grip the shafts 35 and 37. Of course, any releasable type holding means which will releasably retain the squaring member 131 in a selected position along the shafts 35 and 37 can be utilized.

The configuration of the plate 135 is best seen in FIG. 2. As shown in FIG. 2, the gage 11 is being utilized to provide a measurement of the groove 19. (The pipe 13 as shown in FIG. 2 has been enlarged relative to the pipe 13 shown in FIG. 1 to illustrate the use of the gage with pipes of different sizes.) In elevation, the plate 135 is generally of H-shaped configuration with the lower branches H being spread or inclined. Thus, the plate 135 has a planar face 140 and includes parallel legs 141 and 143 and sloping legs 145 and 147, all of which are interconnected by a web 149. The plate 135 has a plurality of apertures 151 formed therein.

The present invention provides means which can be utilized to check the concentricity of the groove 19 and the passage 17. This can be accomplished following the making of groove measurements without resetting of the gage. To accomplish this, a pair of movable members or concentricity elements in the form of eccentrics 153 and 155 (FIGS. 1 and 2a) are rotatably mounted in a selected pair of the apertures 151 in the plate 135 which serves as a support member therefor. The eccentrics 153 and 155 are in the form of a shaft having an eccentric portion 157 and 159, respectively. Operating members 161 and 163 are suitably attached to the eccentrics 153 and 155 to impart pivotal movement thereto relative to the plate 135. With the operating members 161 and 163 in the up position shown in FIGS. 1 and 2, the eccentric portions 157 and 159 are spaced slightly from the internal surface 15 of the pipe 13 FIG. 1 only. However, by turning of the operating members 161 and 163 through a predetermined number of degrees to the position shown in FIG. 2a, the eccentric portions 157 and 159 are moved radially outwardly into engagement with the internal surface 15 of the pipe 13. Movement of the operating members 161 and 163 to the position shown in FIG. 2a causes the eccentric portions 157 and 159 to engage the internal surface 15 and depress the pipe 13 downwardly as permitted by the movable finger 41. As the fixed finger 39 remains stationary, this has the effect of moving the tip 45 of the fixed finger out of contact with the circumferential surface 21 of the groove 19 (FIG. 2a) so that thereafter, the fixed finger 45 exerts no influence on the output of the gage 11.

In preparing the gage 11 for use, the fastener 43 is released and the finger 39 is moved along the shafts 35 and 37 to a preselected position depending upon the diameter of the groove to be checked. Thus, it is apparent that the fixed finger 39 would be set in one position to measure the pipe illustrated in FIG. 1 and in another position to measure the relatively large pipe shown in FIG. 2.

Next, the operating members 161 and 163 are moved to the position shown in FIGS. 1 and 2 in which the eccentric portions 157 and 159 are retracted. The plunger 83 is then depressed to move the movable finger 41 toward the fixed finger 39 a sufficient amount to permit insertion of the ends of the fingers 39 and 41 into the passage 17. The fingers 39 and 41 are inserted into the passage 17 until the tips 45 and 47 thereof engage the circumferential wall 21 of the groove 19 as shown in FIGS. 1 and 2 for small and large diameter pipes, respectively. With the effective length of the connecting member 137 appropriately set, the tips 45 and 47 will be within the groove 19 when the planar face 140 of the plate 135 engages the face 23 of the pipe 13.

As the face 23 is perpendicular to the axis of the pipe, positioning of the planar face 140 of the plate 135 against the face 23 accurately controls the angle at which the fingers are inserted into the passage 17 so that the tips 45 and 47 lie in a diametral plane. With this having been accomplished, it is only necessary to pivot the gage 11 in such diametral plane to find the "high point," i.e., to place the finger elements on a true diameter of the part. The knob 74 is then adjusted to zero the gage. The part is then rotated and the workman notes the readings on the indicator with fluctuations from the zero setting indicating fluctuations in groove diameter. The measurement so taken will typically be a comparative measurement which shows the variation of the diameter as the gage is rotated in a diametral plane relative to the pipe 13.

To check the concentricity of the circumferential surface 21 and the internal surface 15, the operating members 161 and 163 are moved from the retracted position shown in FIGS. 1 and 2 to the extended position shown in FIG. 2a. Next the squaring member is slid along the shafts 35 and 37 until the eccentric portions move the circumferential surface 21 away from the tip 45 of the fixed finger 39 with consequent reflection of such movement on the indicator. The squaring member 131 is then locked in position on the shafts 35 and 37. After the "high point" is located, the indicator 71 is rotated. Any variation in concentricity is noted on the indicator 71. For the concentricity test, both of the eccentric portions 157 and 159 engage the surface 15 to provide stability while the tip 47 of the movable finger 41 engages the circumferential surface 21 of the groove 19.

FIG. 2b shows a modification of the present invention which is identical to the embodiment described hereinabove except that the eccentric 153a and 155a have been moved to a new set of apertures in the plate 135a. In the modification shown in FIG. 2b, portions corresponding to portions of FIG. 1 are designated with corresponding reference numerals followed by the letter a. The eccentrics 153a and 155a are identical to the corresponding eccentrics of the embodiment of FIG. 1 and in the embodiment illustrated they are engaging the internal surface 15a of the pipe 13a for the purposes of conducting a concentricity test. The purpose for moving the eccentrics 153a and 155a to the position shown in FIG. 2 is to permit the conducting of an eccentricity test on a larger diameter pipe than the pipe shown in FIG. 2.

FIGS. 7–9 show a modification of the present invention. Parts in FIGS. 7–9 corresponding to parts in FIGS. 1 and 2 are designated by corresponding reference characters followed by the letter b. The groove gage 11b of FIGS. 7–9 is particularly adapted for measuring an annular groove 19b which is spaced axially inwardly in substantial distance from an end face 23b of the pipe 13b. The groove gage 11b is also adapted for measuring the concentricity of the groove 19b relative to a cylindrical peripheral surface 191 of a circumferentially extending internal shoulder 193.

To this end, the gage 11b includes a fixed finger element 39b including a holder 40ab mounted on shafts 35b and 37b and an elongated contacting section 40b removably mounted on the holder 40ab. The contacting section 40b has a tip 45b which is adapted to contact the circumferentially extending surface 21b for measuring the groove 19b. Similarly, the gage 11b includes a movable finger element 41b which includes an elongated contacting section 48b having a tip 47b which engages the circumferentially extending surface 21b. The gage 11b also includes a squaring member 135b which is mounted on the shafts 35b and 37b in the manner described hereinabove in reference to FIG. 1. The squaring member 135b engages the face 23b of the pipe 13b and the finger elements 40b and 41b project therebeyond the correct amount so that the tips 45b and 47b can be received within the groove 19b as shown in FIG. 7.

For the purposes of conducting the concentricity test, a movable element or concentricity element 195 is slidably mounted on the fixed finger element 40b. Although the movable element 195 can assume various configurations, in the embodiment illustrated it includes two attachment prongs 197 and 199 (FIG. 9) which slidably embrace the lateral surface and a portion of the upper surface of the finger element 40b. The prongs 197 and 199 are joined by an integral web 201.

When the groove 19b is being checked, the movable element 195 is in a retracted position shown in FIG. 7 in which it does not engage the surface 191. To conduct the concentricity test, the movable element 195 is moved into engagement with the surface 191 as shown in FIGS. 8 and 9. The web 201 of the movable element 195 engages the surface 191 along two axially extending lines as shown in FIG. 9 to provide added stability. The effect of this is to remove the tip 45b from contact with the circumferentially extending surface 21b so that the tip 195 engages the surface 191 and the tip 47b engages the circumferentially extending surface 21b. After the "high point" is found and the gage is zeroed, the pipe 13b is rotated to provide readings on the indicator. Except as expressly shown or described herein, the gage 11b is identical to the gage 11.

A thread gage 203 is shown in FIG. 10. The thread gage 203 embodies many of the concepts illustrated hereinabove with reference to the preceding embodiments of the invention. The thread gage 203 includes a frame or supporting structure 204 which include a cover 207 so that a housing for the gage is provided. The frame 205 includes leg sections 209 and 211 interconnected by a web 213. The supporting structure 205 is substantially identical to the supporting structure 25 shown in FIG. 1.

A pair of parallel rods or shafts 215 and 217 are mounted on and extend between the leg sections 209 and 211. The shafts 215 and 217 are mounted on the supporting structure 205 in the same manner that the shafts 35 and 37 are mounted on the supporting structure 25.

A fixed finger element 219 is mounted on the shafts 215 and 217. The finger element 219 preferably includes a clamp section 221 which clampingly embraces the shafts 215 and 217 and which can be tightened by a screw 223. Thus, by a loosening of the screw 223, the finger element 219 can be moved along the shafts 215 and 217 to a new position at which time the screw 223 can be tightened to fix the finger element against movement relative to the shafts.

The thread gage 203 also includes a movable finger element 225 which includes an elongated section 227, a mounting section 229, and an adjusting section 231. The mounting section 229 is tubular and is mounted on the shaft 215 for axial movement therealong by a bearing 233 which is preferably of the type shown in FIGS. 4-6.

In order to check the threads of a member (not shown), the finger elements 219 and 225 include inserts 235 and 237, respectively, which are removably mounted, as by screws 239 on the finger elements. The inserts 235 and 237 have threaded surfaces 240 and 241, respectively, which confront each other and which are adapted to engage the threads which are to be checked. Each of the surfaces 240 and 241 have several V-shaped grooves. The inserts 235 and 237 can be quickly removed and replaced with other inserts having different size threads to thereby permit the changeover of the gage 203 to checking different size threads. Similarly, inserts could be mounted with the threaded surfaces thereof being directed away from each other so that the gage may be used to check internal threads. Each of the inserts 235 and 237 has two peripheral, guide surfaces 242a which extend at predetermined angles such as 60° with the horizontal as viewed in FIG. 10.

To permit adjusting of the angular position of the movable finger element 225 on the shaft 215, a guide pin 243 having an eccentric portion and otherwise being identical to the guide pin 69 (FIG. 1) and a roller bearing 245 which is identical to the roller bearing 61 are provided. The guide pin 243 and the roller bearing 245 cooperate in the same manner as the bearing 61 and the guide pin 69 to permit adjustment of the finger 225 so that the threaded surfaces 240 and 241 will be in the same plane while still allowing free axial movement of the movable finger element 225 axially of the shaft 215.

A coil spring 247 surrounds an upper part of the shaft 215 and acts between a portion 248 of the supporting structure 205 and the upper end face of the mounting section 229 to urge the finger 225 downwardly.

A lever 251 is mounted within the supporting structure 205 for pivotal movement by a pin 253. One end of the lever 251 lies beneath a projection 255 formed integrally with the mounting section 229 so that downward movement of the finger element 225 pivots the lever 251 counterclockwise about the pin 253. An adjustable stop 257 which may be identical to the adjustable stop 75 (FIG. 1) limits the counterclockwise pivotal movement of the lever 251 and therefore limits the downward travel of the movable finger element 225. A plunger 259, which may be identical to the plunger 83 of FIG. 1, can be depressed to pivot the lever 251 clockwise to thereby raise the movable finger element 225. The projection 255 also engages a movable tip 261 of the indicator 263 so that the movement of the movable finger element 225 can be measured or compared by the indicator 263. The indicator 263 can be zeroed by an adjusting knob 265.

In use of the gage 203, the inserts 235 and 237 are accurately aligned using a gage 271 having alignment surfaces 273 which have a shape which is complementary to the surfaces 242a. With the inserts aligned the screw 239 are tightened and the finger 219 is moved along shafts 215 and 217 to permit removal of the gage 271. Then using a gage block or a ground standard the distance between the inserts 235 and 237 is accurately established as by positioning the standard between the inserts 235 and 237 and moving the fixed finger 219 until contact is made with both inserts. The screw 223 is then tightened to fix the finger element 219 at the position established by the standard.

By depressing the plunger 259, the inserts 235 and 237 can be easily moved into position along the threads of the object which are to be checked. When the plunger is released, the threaded surfaces 240 and 241 engage the threads which are to be checked and by relatively rotating the gage and the object the true diameter of "high point" of the object can be located. Then the gage is pivoted about an axis which extends generally radially of the object to align the helixes of the inserts and the object. Then the indicator 263 can be zeroed using the adjusting knob 265. The part is then rotated relative to the threads on the object which is being checked or the gage is repositioned on the threads at a different location. Any dimensional change of the threads will cause movement of the movable finger element 225 which is transferred to the indicator 263 via the projection 255 and the tip 261. Such dimensional change may be caused, for example, by a variation in pitch of the threads which prevent the threads of the part from bottoming out in the grooves of the insert. An advantage of the multiple grooves in the surfaces 240 and 241 is that several threads can be checked simultaneously and the pitch can be checked. Pitch diameter can be checked with the inserts 235 and 237 or with other inserts having only a single groove in each.

Although various embodiments of the invention have been shown and described, many changes, modifications and substitutions may be made by one having ordinary skill in the art without necessarily departing from the spirit and scope of this invention.

I claim:

1. A gage for measuring the concentricity of first and second arcuate portions of a bore in an object wherein the first and second portions have different diameters comprising:
    a supporting structure;
    a first finger element;
    means for mounting said first finger element on said supporting structure for movement relative thereto, said first finger element being engageable with the surface of the portion of said bore having the larger diameter;
    a support member;
    means for mounting said support member on said supporting structure in fixed relationship thereto; and
    a movable member mounted on said support member, said movable member being movable between a first position in which it is out of engagement with both portions of said bore to a second position in which it engages the surface of the portion of the bore having the smaller diameter whereby rotation of said gage relative to the bore causes the first finger element to move in proportion to any eccentricity between the two bore portions to thereby provide an output which is a function of the concentricity of the two bore portions.

2. A gage as defined in claim 1 wherein said movable member includes an eccentric pivotally mounted on said support member.

3. A gage as defined in claim 2 wherein said support member includes a squaring member engageable with the object at the mouth of the bore to control the angle at which the finger element projects into the bore and said eccentric is pivotally mounted on said squaring member.

4. A gage as defined in claim 1 wherein said support member includes a fixed finger adapted to engage the surface of the portion of the bore having the larger diameter and said movable member is movably mounted on said fixed finger and causes the fixed finger to be out of contact with the surface of said bore when the movable member is in said second position.

5. A gage for measuring the concentricity of first and second arcuate portions of a bore in an object wherein the first and second portions have different diameters, said gage comprising:
a supporting structure;
a first measuring element;
a second measuring element;
means for mounting said first measuring element on said supporting structure for movement relative thereto generally toward and away from said second measuring element;
means for mounting said second measuring element on said supporting structure in fixed relationship thereto, said measuring elements being engageable with spaced regions of the surface of the portion of said bore having the larger diameter;
at least one concentricity element;
means for mounting said concentricity element on said supporting structure for movement between a first position in which the concentricity element is out of engagement with both portions of said bore and a second position in which the concentricity element engages the surface of the portion of the bore having the smaller diameter; and
indicator means on the supporting structure for providing a reading indicative of the relative position of the first measuring element.

6. A gage as defined in claim 5 wherein said last-mentioned means includes said second measuring element.

7. A gage as defined in claim 6 wherein said second measuring element includes an elongated finger element and said concentricity element is mounted thereon for movement along the elongated finger.

8. A gage as defined in claim 5 wherein said last mentioned means includes a squaring member fixedly mounted on said supporting structure, said concentricity element being mounted on said squaring member for movement between said first and second positions, said first and second measuring elements projecting sufficiently beyond said squaring member so as to be engageable with the portion of said bore having the largest diameter, said object having an end face against which the squaring member can be seated to orient the measuring elements and the concentricity element in at least one plane.

9. A gage as defined in claim 8 including a second concentricity element and each of said concentricity elements includes a cam pivotally mounted on said squaring plate, each of said cams being movable between said first and second positions.

10. A gage as defined in claim 5 wherein said object has an end face and said gage includes a squaring plate fixedly mounted on said supporting structure, said squaring plate being engageable with said end face to appropriately position the measuring elements and the concentricity element in at least one plane in said bore, said measuring elements projecting beyond said squaring plate sufficiently to be capable of engaging the portion of the bore of larger diameter.

11. A gage as defined in claim 10 wherein said gage includes means for mounting said squaring plate on said supporting structure at any one of a plurality of different positions and means for fixing the squaring plate in any one of said positions to thereby fix the squaring plate relative to said supporting structure.

12. A gage for measuring the concentricity of first and second arcuate portions of a bore in an object wherein the first and second portions have different diameters comprising:
a supporting structure;
a first measuring element;
a second measuring element;
means for mounting said first measuring element on said supporting structure for movement relative thereto generally toward and away from the second measuring element;
means for mounting said second measuring element on said supporting structure in fixed relationship thereto, said first and second measuring elements being engageable with the surface of the portion of said bore having the larger diameter;
means mounted on said supporting structure and selectively engageable with the surface of the portion of the bore having the smaller diameter to remove the second measuring element from contact with the surface of the portion of the bore having the larger diameter whereby relative rotation between the gage and the object causes the first measuring element to move in a manner which is a function of the concentricity of the two bore portions; and
indicator means on the supporting structure for providing a reading in response to the relative position of the first measuring element.

13. A gage for checking the measurements of an object comprising:
a supporting structure including first and second shafts and means for mounting said shafts in parallel relationship;
a first finger element engageable with the object;
means for mounting said first finger element on both of said shafts, said mounting means being releasable to permit movement of said first finger element along said shafts;
a second finger element engageable with the object;
means for mounting said second finger element at least on said first shaft for movement therealong toward and away from said first finger element;
indicator means responsive to the movement of said second finger element toward and away from said first finger element to provide an indication of the measurement of the object;
said second finger element including a segment for engaging the object and an adjusting section extending in a direction generally opposite to said segment;
said first finger element and said segment of said second finger element projecting on the same side of said first shaft and being substantially parallel; and
means mounted on said supporting structure and engageable with said adjusting section for precisely adjusting the position of said segment of said second finger element so that it lies in the same plane as first finger element.

14. A gage as defined in claim 13 wherein each of said finger elements has a threaded member mounted thereon to check the threads of an object.

15. A gage as defined in claim 13 wherein first and second inserts are removably mounted on said first and second finger elements, respectively, each of said inserts having a plurality of grooves therein for checking the threads of an object.

16. A gage for measuring an object comprising:
a supporting structure;
a first finger element;
means for mounting said first finger element on said supporting structure in fixed relationship relative thereto;
a second finger element;

means for mounting said second finger element on said supporting structure in generally parallel relationship to said first finger element for movement along a first path and for pivotal movement about a first axis;

said first path extending generally between said finger elements and said pivotal axis being generally parallel to said path;

means for adjusting the position of said second finger element about said first pivotal axis to thereby permit accurately bringing said finger elements into parallel relationship; and indicator means responsive to the movement of said second finger element along said first path toward and away from said first finger element to provide an indication of the measurement of the object.

17. A gage as defined in claim 16 wherein said supporting structure includes a shaft on which both of said finger elements are at least partially mounted, said shaft defining said pivotal axis.

18. A gage as defined in claim 16 wherein said second finger element includes a segment for engaging the object and an adjusting section extending in a direction generally opposite to said segment, said pivotal axis lying intermediate the extremities of said second finger element, said adjusting section having an opening therein, a bearing received in the opening of the adjusting section, said bearing having a passage therein and a cam mounted on said supporting structure for pivotal movement relative thereto and received within the passage of said bearing for pivoting said second finger element about said pivotal axis, said bearing permitting said second finger element to move along said path.

19. A gage for measuring an object comprising:

a supporting structure including first and second leg sections interconnected by a web and first and second shafts mounted on said leg sections and extending therebetween in generally parallel relationship with both of said shafts being spaced over at least portions of their respective lengths from said web whereby said web defines manual gripping means;

a first finger element engageable with the object;

releasable means for mounting said first finger element on both of said shafts in fixed relationship relative thereto, said mounting means being releasable to permit movement of the first finger element along said shafts to another position at which the releasable means can fixedly mount the first finger element on said shafts;

a second finger element engageable with the object;

means for mounting said second finger element at least on said first shaft for movement therealong toward and away from said first finger element, said finger elements projecting on the same side of said first shaft and being generally in the same plane;

biasing means for urging said second finger element along said first shaft in a direction away from said first finger element; and indicator means responsive to the position of said second finger element along said first shaft relative to said first finger element to provide an indication of a measurement of the object.

20. A gage as defined in claim 19 including threads carried by said finger elements in a position to engage the object.

21. A gage as defined in claim 19 including means to adjust the force of said biasing means.

22. A gage as defined in claim 19 including a squaring plate mounted on said shafts, said squaring plate lying on the same side of said first shaft as said finger elements, said finger elements projecting beyond said squaring plate on said side of said first shaft, and means for adjusting the distance between the squaring plate and said first plate.

23. A gage as defined in claim 22 including a concentricity element mounted on said squaring plate for movement into and out of engagement with a surface of a bore in the object and cooperable with the second finger element to measure the concentricity of two portions of such bore, said mounting means for said second finger element mounting said second finger element for pivotal movement about said first shaft and means for adjusting the angular position of the second finger element about the first shaft.

* * * * *